(12) United States Patent
Hashimura et al.

(10) Patent No.: US 8,708,079 B2
(45) Date of Patent: Apr. 29, 2014

(54) VEHICLE BODY STRUCTURE

(75) Inventors: Tadayoshi Hashimura, Machida (JP);
Makoto Iwasa, Chigasaki (JP); Seiichi Ichihara, Fujisawa (JP); Nobuhiro Mori, Odawara (JP); Kenji Tamura, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/319,911

(22) PCT Filed: May 25, 2010

(86) PCT No.: PCT/IB2010/001241
§ 371 (c)(1),
(2), (4) Date: Nov. 10, 2011

(87) PCT Pub. No.: WO2010/143041
PCT Pub. Date: Dec. 16, 2010

(65) Prior Publication Data
US 2012/0049572 A1    Mar. 1, 2012

(30) Foreign Application Priority Data
Jun. 11, 2009    (JP) .................. 2009-139901

(51) Int. Cl.
*B60K 28/14*    (2006.01)
(52) U.S. Cl.
USPC ..................... 180/68.5; 180/311; 280/782
(58) Field of Classification Search
USPC ........ 180/68.5, 271, 281, 290, 291, 232, 311, 180/65.1; 280/782, 783, 784, 785; 320/107, 320/109, 112, 113; 429/96, 99, 100; 296/187.03, 187.05, 187.11, 37.16, 296/37.6
See application file for complete search history.

(56) References Cited

U.S. PATENT DOCUMENTS

| | | | | |
|---|---|---|---|---|
| 4,090,577 | A * | 5/1978 | Moore | 180/243 |
| 5,971,088 | A * | 10/1999 | Smith | 180/165 |
| 7,004,274 | B2 * | 2/2006 | Shibasawa et al. | 180/68.5 |
| 7,021,412 | B2 * | 4/2006 | Koike et al. | 180/68.5 |
| 7,066,515 | B2 * | 6/2006 | Pierce et al. | 296/21 |
| 7,641,013 | B2 * | 1/2010 | Kim et al. | 180/68.5 |

(Continued)

FOREIGN PATENT DOCUMENTS

| | | |
|---|---|---|
| JP | 04-299029 | 10/1992 |
| JP | 07-101353 | 4/1995 |

(Continued)

OTHER PUBLICATIONS

A Written Opinion of the International Search Authority for International Application No. PCT/IB2010/001241, dated Aug. 31, 2010, mailed Sep. 7, 2010.

(Continued)

*Primary Examiner* — John Walters
*Assistant Examiner* — Brian Swenson
(74) *Attorney, Agent, or Firm* — Global IP Counselors, LLP

(57) ABSTRACT

A vehicle body structure is provided with a vehicle body member, a charger, a structural support member. The charger includes an upper end portion and a lower end portion. The lower end portion of the charger is supported on the vehicle body member. The structural support member extends in a widthwise direction of the vehicle body structure in a position rearward of the upper end portion of the charger and adjacent the upper end portion of the charger.

13 Claims, 4 Drawing Sheets

(56) References Cited

U.S. PATENT DOCUMENTS

| | | | |
|---|---|---|---|
| 7,690,686 B2* | 4/2010 | Hashimura et al. | 280/782 |
| 7,886,861 B2* | 2/2011 | Nozaki et al. | 180/232 |
| 7,921,951 B2* | 4/2011 | Watanabe et al. | 180/68.5 |
| 8,272,685 B2* | 9/2012 | Lucas et al. | 297/180.1 |
| 8,297,387 B2* | 10/2012 | Kadoi et al. | 180/65.1 |
| 8,302,716 B2* | 11/2012 | Yoda | 180/68.5 |
| 2004/0079569 A1* | 4/2004 | Awakawa | 180/68.5 |
| 2012/0031695 A1* | 2/2012 | Tsuchiya et al. | 180/68.5 |

FOREIGN PATENT DOCUMENTS

| | | |
|---|---|---|
| JP | 10-112902 | 4/1998 |
| JP | 2001-097149 | 4/2001 |
| JP | 2007-269249 | 10/2007 |
| JP | 2008-230556 | 10/2008 |
| WO | 2005/084985 A1 | 9/2005 |

OTHER PUBLICATIONS

An International Preliminary Report on Patentability for International Application No. PCT/IB2010/001241 dated Sep. 2, 2011.

An English translation of the Chinese Office Action for the corresponding Chinese patent application No. 201080025680.2 issued on Dec. 3, 2013.

* cited by examiner

US 8,708,079 B2

VEHICLE BODY STRUCTURE

CROSS-REFERENCE TO RELATED APPLICATIONS

This application is a U.S. National stage of International Application No. PCT/IB2010/001241, filed May 25, 2010, which claims priority to Japanese Patent Application No. 2009-139901, filed on Jun. 11, 2009. The entire disclosure of Japanese Patent Application No. 2009-139901 is hereby incorporated herein by reference.

BACKGROUND

1. Field of the Invention

The present invention generally relates to a rearward portion of a vehicle body for an electric vehicle. More specifically, the present invention relates to providing protection to a charger of a vehicle body structure.

2. Background Information

Electric vehicles run using an electric motor as a drive source. Hybrid vehicles run using both an electric motor and an engine as drive sources. In either case, electric vehicles and hybrid vehicles typically include a battery. Often a charger is installed on the vehicle for charging the battery. One example of such a hybrid vehicle is disclosed in Japanese Laid-Open Patent Publication No. 2007-269249). The hybrid vehicle disclosed in this publication has a battery and a charger that are installed in a rearward portion of the vehicle body.

SUMMARY

In the vehicle described in Japanese Laid-Open Patent Publication No. 2007-269249, the charger is attached to the battery at the rearward portion of the vehicle body. Consequently, the charger could be damaged if the vehicle undergoes, for example, a rear collision.

One object of the present disclosure is to provide a vehicle body structure for a rearward portion of a vehicle body that can reliably protect a charger when a vehicle undergoes a rear collision or the like.

In view of the state of the known technology, one aspect of this disclosure is to provide a vehicle body structure that mainly comprises a vehicle body member, a charger, a structural support member. The charger includes an upper end portion and a lower end portion. The lower end portion of the charger is supported on the vehicle body member. The structural support member extends in a widthwise direction of the vehicle body structure in a position rearward of the upper end portion of the charger and adjacent the upper end portion of the charger.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
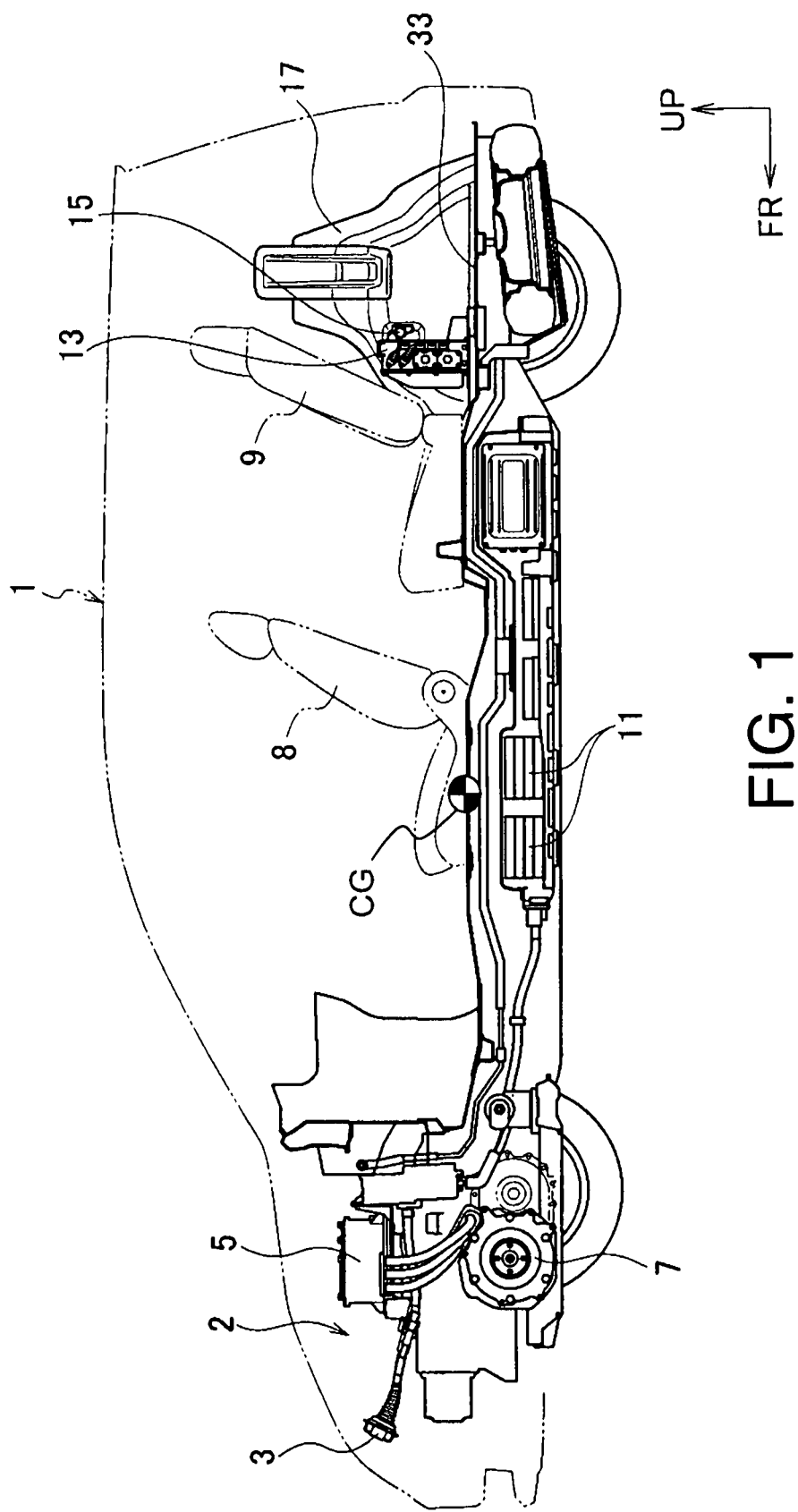
FIG. 1 is a schematic longitudinal cross sectional view of a vehicle having a vehicle body structure according to one illustrated embodiment.

Referring initially to FIG. 1, a vehicle 1 is illustrated having a vehicle body structure in accordance with a first embodiment. In the figures, an arrow FR indicates a frontward direction of the vehicle 1, an arrow UP indicates an upward direction of the vehicle 1, and an arrow WD indicates a widthwise direction of the vehicle 1. The vehicle body structure includes a part of a rearward portion of a vehicle body of the vehicle 1. The vehicle 1 is illustrated as an electric vehicle, but can also be configured as a hybrid vehicle or a fuel cell vehicle. In any event, in the illustrated embodiment, the vehicle body of the vehicle 1 has a motor room 2 that is provided in a frontward portion of the vehicle body. A charging port 3, an inverter 5 and an electric motor 7 are arranged inside the motor room 2. The vehicle body of the vehicle 1 forms a vehicle cabin with a front seating 8 and a rear seating 9. The front seating 8 is provided in a frontward position inside the vehicle cabin. The rear seating 9 is provided in a rearward position inside the vehicle cabin. A battery 11 is stored below the front seat 8 and the rear seat 9. The battery 11 serves as an electrical power source that drives the electric motor 7. When the electric motor 7 is operated (when the vehicle 1 is driven), high-voltage DC electric power is supplied from the battery 11 to the inverter 5 through a high-voltage harness to the electric motor 7.

Figure 2:
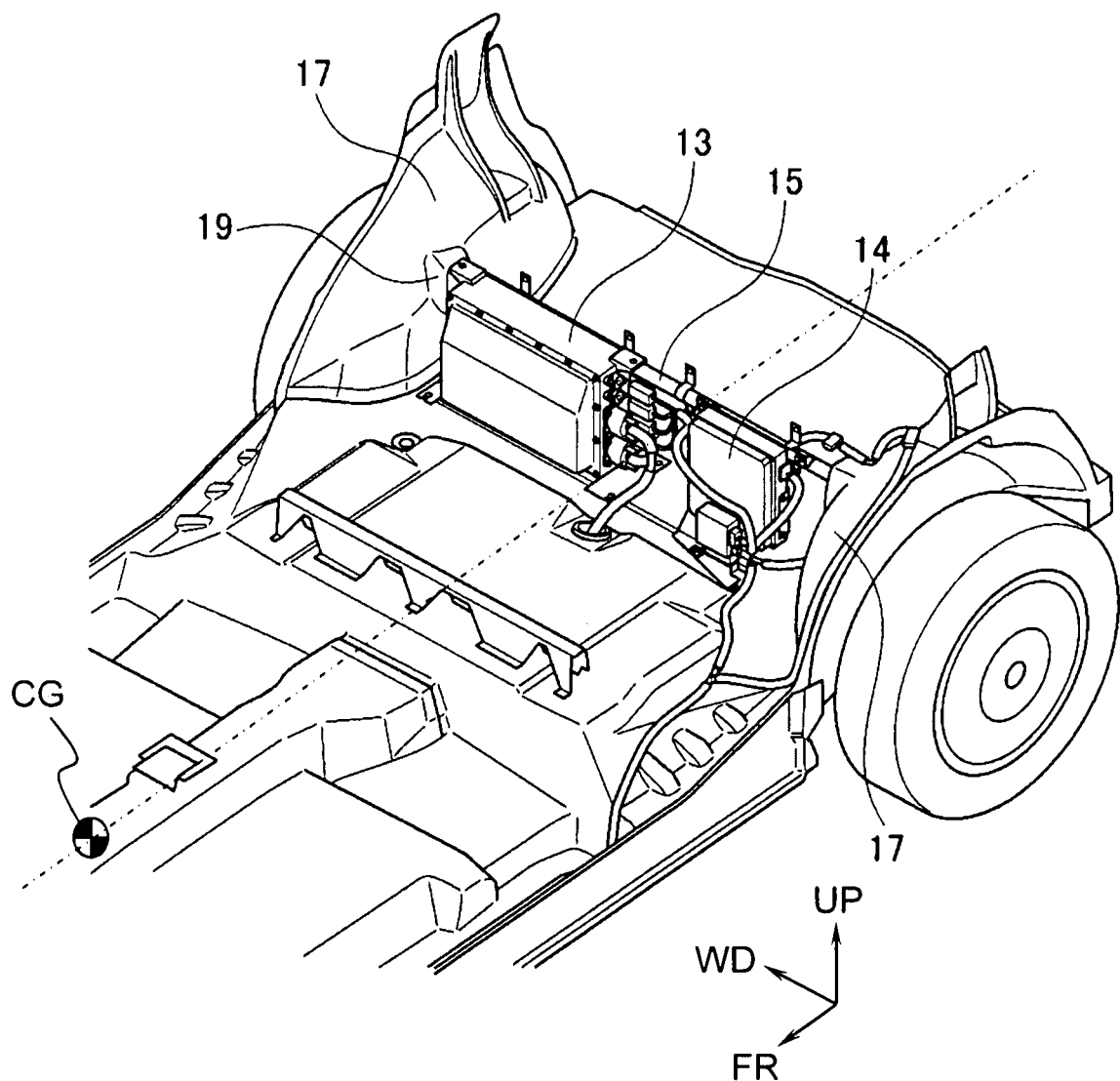
FIG. 2 is a perspective view of the vehicle body structure shown in FIG. 1.
Figure 3:
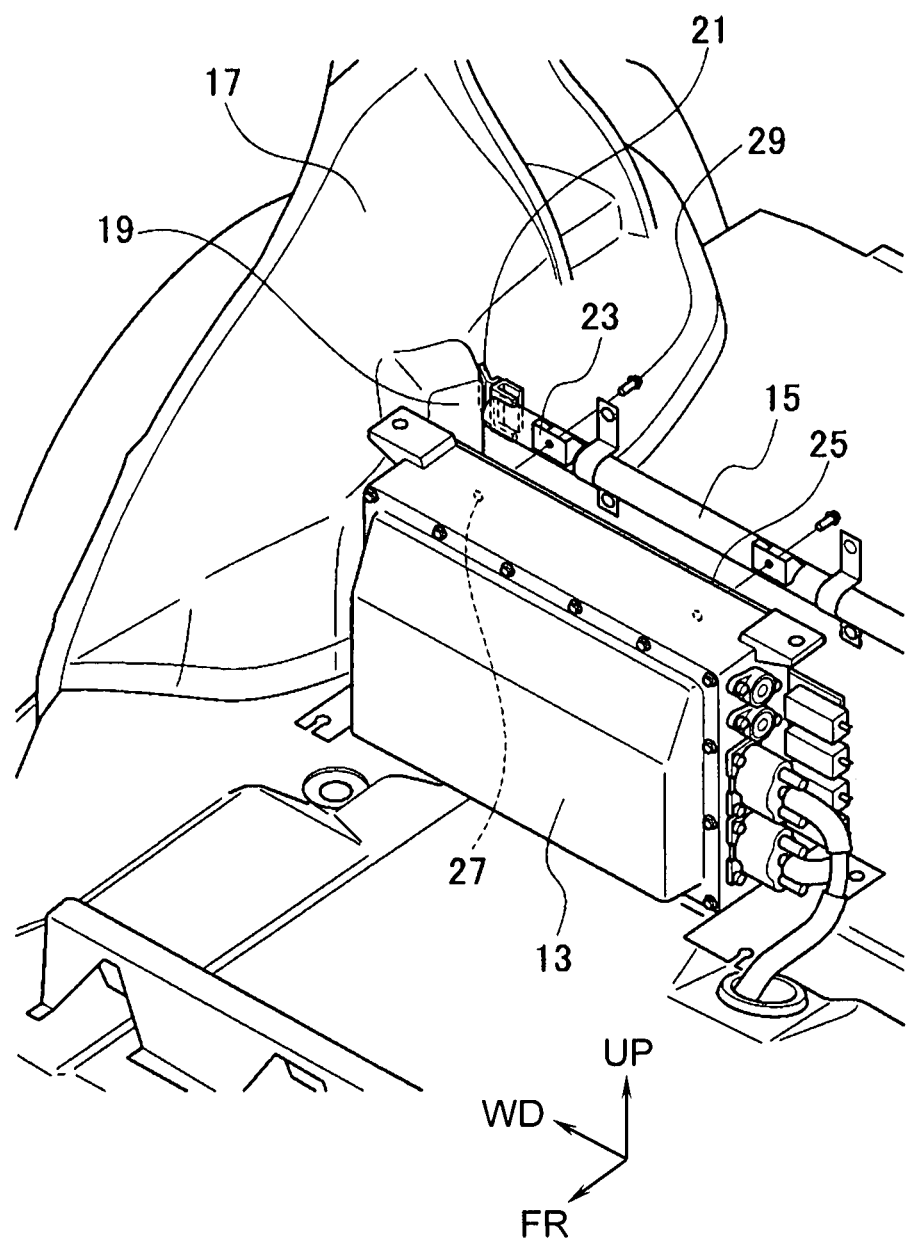
FIG. 3 is an enlarged, partial perspective view the vehicle body structure of FIG. 2.
Figure 4:
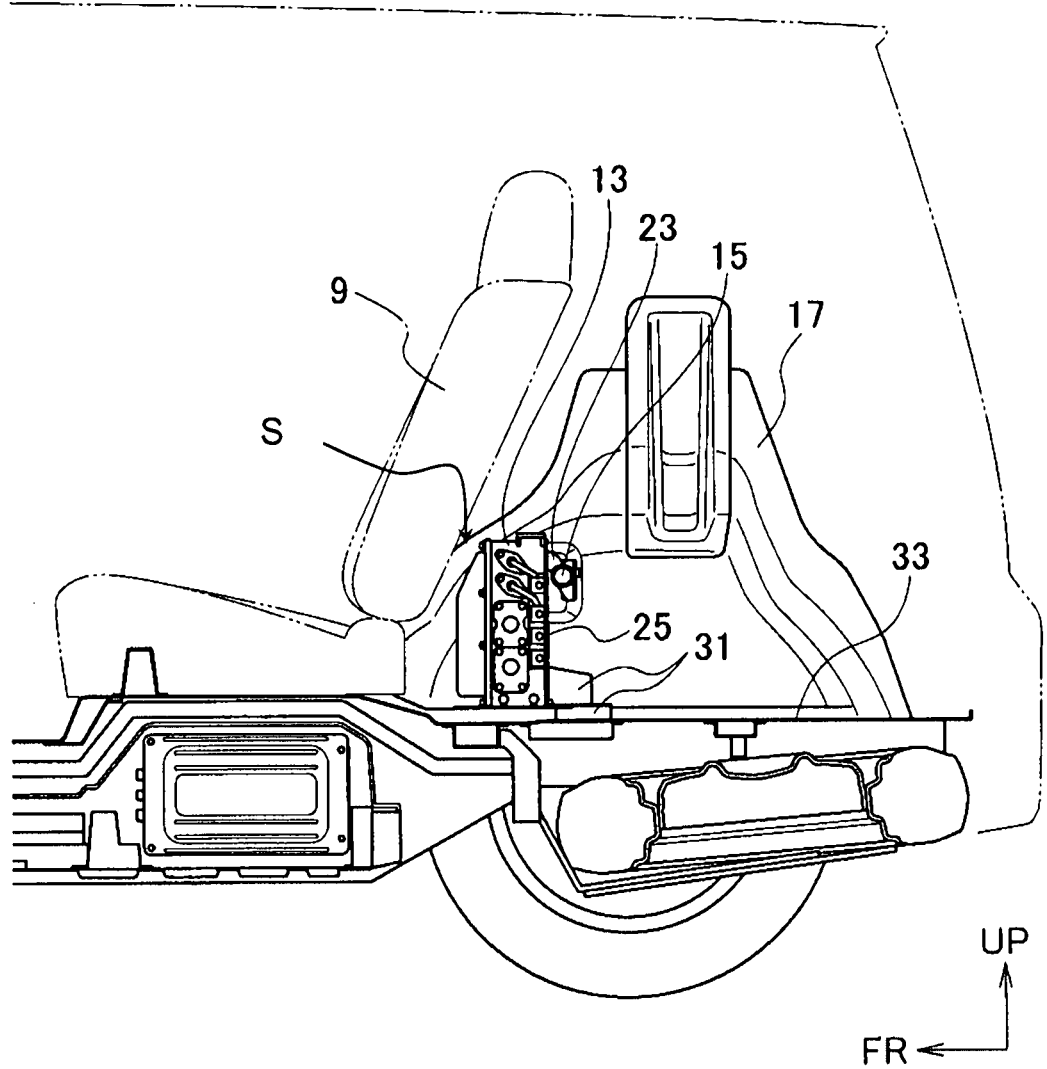
FIG. 4 is an enlarged, partial longitudinal cross sectional view of the vehicle body structure of shown in FIGS. 1 to 3, with the charger being in a preinstalled position.

As seen in FIGS. 2 to 4, the vehicle body structure has a charger 13, a high-power (auxiliary) component 14 and a connecting bar 15 that are arranged behind the rear seating 9. The high-power (auxiliary) component 14 is operatively coupled to the charger 13 via the battery 11 to receive high-voltage electric power from the charger 13. The charging port 3 is connected to an electric charging harness such that electric power is transferred from the charging port 3 to the charger 13 through the charging harness 16 before reaching the battery unit 7.

As seen in FIG. 1, the charger 13 is further disposed on a rearward side of a center of gravity CG of the vehicle 1 with respect to the longitudinal direction of the vehicle 1. As also seen in FIG. 1, the electric motor 7 and the inverter 5 are examples of the high-powered components that are disposed forward of the center of gravity CG of the vehicle 1. In other words, the electric motor 7 and the inverter 5 (e.g., the high-powered components) are disposed on opposite side of the center of gravity CG from the charger 13 with respect to the longitudinal direction of the vehicle 1. The battery 11 is disposed between the charger 13 and the high-powered components (e.g., the electric motor 7 and the inverter 5).

The vehicle body structure further includes a pair of (left and right) wheel wells 17. The left and right wheel wells 17 are provided behind the rear seating 9 on side portions of the inside of the vehicle cabin. In particular, the left and right wheel wells 17 are formed in side panels of the rearward portion of the vehicle body. More specifically, as shown in FIG. 3, each of the left and right wheel wells 17 is configured to bulge in a curved fashion toward the inside of the vehicle cabin. Each of the left and right wheel wells 17 has an inward protrusion 19 that is formed integrally on a portion of the respective one of the wheel wells 17.

The connecting bar 15 extends between the left and right wheel wells 17. In the illustrated embodiment, opposite (left and right) ends of the connecting bar 15 are each provided with a fastening plate 21. The fastening plates 21 formed on both (left and right) ends of the connecting bar 15 are welded to a rearward surface of each of the protrusions 19. The charger 13 and the high-power (auxiliary) component 14 are mounted to a frontward side of the connecting bar 15 at positions that are aligned with the protrusions 19 as viewed in the widthwise direction of the vehicle body structure.

The connecting bar 15 is an elongated cylindrical support member made of a rigid metal material, e.g., an aluminum alloy. Thus, the connecting bar 15 constitutes a structural support member. Two upper mounting brackets 23 are arranged on an upper surface of the connecting bar 15 with a prescribed widthwise spacing in-between. The upper mounting brackets 23 protrude in an upward direction from the connecting bar 15. Each of the upper mounting brackets 23 is provided with a bolt hole. A back plate 25 is attached to a rearward surface of the charger 13. The back plate 25 is provided with mounting holes 27 corresponding to the bolt holes of the upper mounting brackets 23. The charger 13 is fastened to the connecting bar 15 by passing bolts 29 through the bolt holes of the upper mounting brackets 23 and screwing the bolts 29 into the mounting holes 27 of the back plate 25 of the charger 13.

As shown in FIG. 4, the connecting bar 15 is arranged rearward of an upper end portion of the charger 13 so as to be in close proximity to the charger 13. In other words, the connecting bar 15 is arranged adjacent the upper end portion of the charger 13 in a location just rearward of the upper end portion of the charger 13. A lower end portion of the back plate 25 of the charger 13 is fastened to a floor panel 33 of the vehicle body with a lower mounting bracket 31.

The charger 13 is configured to convert a low-voltage electric power supplied from an external source into a high-voltage electric power. The high-voltage electric power is then supplied to the battery 11 and the high-power (auxiliary) component 14, which are operatively (electrically) coupled to the charger 13. For example, in the illustrated embodiment, the charger 30 is a device that coverts alternating current supplied from an external AC power source (e.g., a household power outlet—100V or 200V), into direct current for charging the battery 11 and/or supplying electric power to the high-power (auxiliary) component 14. Preferably, the charger 13 has an orientation with a front to aft vehicle dimension that is smaller than a vertical vehicle dimension of the charger 13 such that the charger 13 can be pivoted or tilted forward by forward deformation of the connecting bar 15 during a rear collision of the vehicle 1. To allow for the pivoting or tilting of the charger 13, an unobstructed space S is disposed immediately forward of the upper end portion of the charger 13 with respect to the longitudinal direction of the vehicle 1.

A deformation behavior exhibited by the charger 13 will now be explained that corresponds to when a rear collision load is imparted to a rearward portion of the vehicle body from a rearward direction. When a rear collision load is imparted to a rearward portion of the vehicle body in a forward direction parallel to the longitudinal direction of the vehicle 1, the connecting bar 15 deforms so as to move in a frontward direction. This forward deformation of the connecting bar 15 pushes the charger 13 frontward with respect to the longitudinal direction of the vehicle 1. Since a bottom portion of the charger 13 is connected to the floor panel 33 through the lower mounting bracket 31, the charger 13 is pushed over in a frontward direction while pivoting about the lower mounting bracket 31.

Operational effects obtained with the illustrated embodiment will now be explained.

First, in the illustrated embodiment, the charger 13 is arranged in the rearward portion of the vehicle body, with the lower end portion of the charger 13 being supported on the lower mounting bracket 31 (vehicle body member), and with the connecting bar 15 extending in the widthwise direction of the vehicle in a position immediately rearward of the charger 13. Thus, when a rear collision load is imparted to the rearward portion of the vehicle body such that the load is applied in a frontward direction, the connecting bar 15 moves frontward so as to push the charger 13 over in the frontward direction, thereby protecting the charger 13. Thus, if the vehicle 1 undergoes a rearward collision, for example, the charger 13 avoids receiving a large impact and can be reliably protected. In particular, with this embodiment, the charger 13 having a case oriented with a long dimension extending in a vertical direction can be both securely fastened to the connecting bar 15 and reliably protected when the vehicle undergoes a collision.

Second, the strength of the rearward portion of the vehicle body is increased by the connecting bar 15 arranged to connect the left and right wheel wells 17. As a result, the strength of the vehicle body with respect to a load imparted from a side of the vehicle 1 is increased. Also with the connecting bar 15 (the structural support member) laterally connecting the left and right wheel wells 17, the connecting bar 15 can be shortened relative to other locations of the vehicle body.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also as used herein to describe the above embodiment(s), the following directional terms "forward", "rearward", "above", "downward", "vertical", "horizontal", "below" and "transverse" as well as any other similar directional terms refer to those directions of a vehicle on flat, level ground and equipped with the vehicle body structure. Accordingly, these terms, as utilized to describe the present invention should be interpreted relative to a vehicle equipped with the vehicle body structure on flat, level ground. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
a vehicle body member;
a left wheel well disposed on a first side of the vehicle body member, the left wheel well having an inward protrusion bulging in a curved fashion inward with respect to the vehicle body;
a right wheel well disposed on a second side of the vehicle body member, the right wheel well having an inward protrusion bulging in a curved fashion inward with respect to the vehicle body;
a charger including an upper end portion and a lower end portion, with the lower end portion of the charger being supported on the vehicle body member; and
a structural support member extending in a widthwise direction of the vehicle body structure in a position rearward of the upper end portion of the charger and adjacent the upper end portion of the charger, the structural support member connecting the left wheel well and the right wheel well together, the structural support member having a first end attached to the inward protrusion of the left wheel well and a second end attached to the inward protrusion of the right wheel well.

2. The vehicle body structure as recited in claim 1, wherein the charger has an orientation with a front to aft vehicle dimension that is smaller than a vertical vehicle dimension of the charger.

3. The vehicle body structure as recited in claim 2, wherein the vehicle body structure has an unobstructed space disposed immediately forward of the upper end portion of the charger with respect to a longitudinal direction of the vehicle body structure.

4. The vehicle body structure as recited in claim 2, wherein a high-power component disposed in a frontward portion of the vehicle body structure, and the charger being disposed in a rearward portion of the vehicle body structure.

5. The vehicle body structure as recited in claim 4, wherein the high-power component being at least one of a motor and an inverter.

6. The vehicle body structure as recited in claim 1, wherein the vehicle body structure has an unobstructed space disposed immediately forward of the upper end portion of the charger with respect to a longitudinal direction of the vehicle body structure.

7. The vehicle body structure as recited in claim 6, wherein a high-power component disposed in a frontward portion of the vehicle body structure, and the charger being disposed in a rearward portion of the vehicle body structure.

8. The vehicle body structure as recited in claim 7, wherein the high-power component being at least one of a motor and an inverter.

9. The vehicle body structure as recited in claim 1, wherein a high-power component disposed in a frontward portion of the vehicle body structure, and the charger being disposed in a rearward portion of the vehicle body structure.

10. The vehicle body structure as recited in claim 9, wherein the high-power component being at least one of a motor and an inverter.

11. The vehicle body structure as recited in claim 1, further comprising
a battery operatively coupled to the charger, with the charger being configured to convert a low-voltage electric power supplied from an external source into a high-voltage electric power; and
a high-power component operatively coupled to the battery, with the high-powered component and the charger being disposed on opposite sides of a center of gravity of a vehicle with respect to a longitudinal direction of the vehicle, and the charger being further disposed on a rearward side of the center of gravity of the vehicle.

12. The vehicle body structure as recited in claim 11, wherein
the battery is disposed between the charger and the high-power component with respect to the longitudinal direction of the vehicle body structure.

13. The vehicle body structure as recited in claim 1, wherein
the structural support member is arranged to deform in a frontward direction in response to a rear collision load being imparted to a rearward portion of a vehicle body having the vehicle body structure.

* * * * *